United States Patent [19]

Peppers et al.

[11] Patent Number: 5,282,189
[45] Date of Patent: Jan. 25, 1994

[54] SYSTEM FOR THERMALLY ERASING DATA STORED ON AN OPTICAL RECORDING MEDIUM

[75] Inventors: Norman A. Peppers, Belmont; Eric J. Shrader, La Honda, both of Calif.

[73] Assignee: Samsung Electronics Co. Ltd., Suwon, Rep. of Korea

[21] Appl. No.: 796,016

[22] Filed: Nov. 22, 1991

[51] Int. Cl.⁵ .............................................. G11B 7/22
[52] U.S. Cl. ...................................... 369/114; 369/13; 369/100; 360/130.2; 360/130.23
[58] Field of Search ............... 369/100, 112, 114, 116, 369/13, 32; 360/114, 130.2, 130.22, 130.23

[56] References Cited

U.S. PATENT DOCUMENTS

| | | | |
|---|---|---|---|
| 4,633,455 | 12/1986 | Hudson | 369/112 |
| 4,686,597 | 8/1987 | Johnston | 360/130.23 |
| 4,773,060 | 9/1988 | Shimada et al. | 369/100 |
| 4,774,702 | 9/1988 | Giacomel | 369/100 |
| 4,833,663 | 5/1989 | Satoh et al. | 369/32 |
| 4,970,707 | 11/1990 | Hara et al. | 369/44.11 |
| 4,970,711 | 11/1990 | Martin et al. | 369/100 |
| 4,977,549 | 12/1990 | Berg | 360/114 |

Primary Examiner—Paul M. Dzierzynski
Assistant Examiner—Drew A. Dunn

[57] ABSTRACT

A system for erasing data stored on an optical storage medium includes a housing, a guiding means mounted within the housing for guiding the optical recording medium on which the data is stored, and a heating means mounted in spaced-apart opposition to the guiding means for heating the optical recording medium to, thereby, thermally erase optical data stored on the medium.

19 Claims, 2 Drawing Sheets

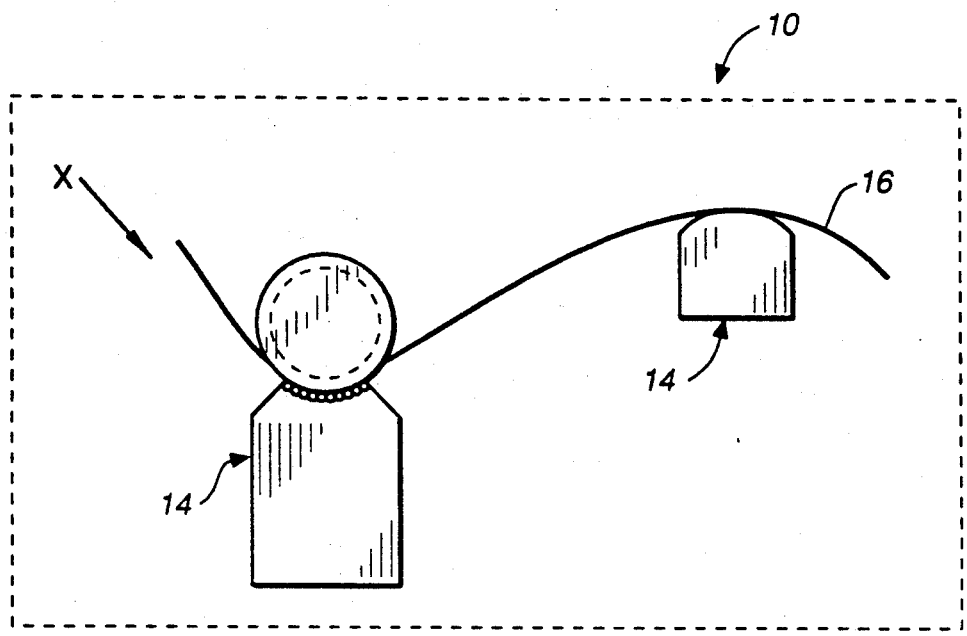
FIG._1
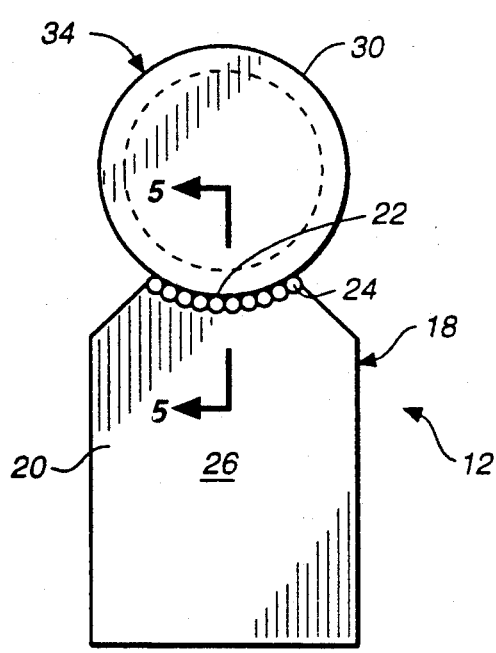
FIG._2
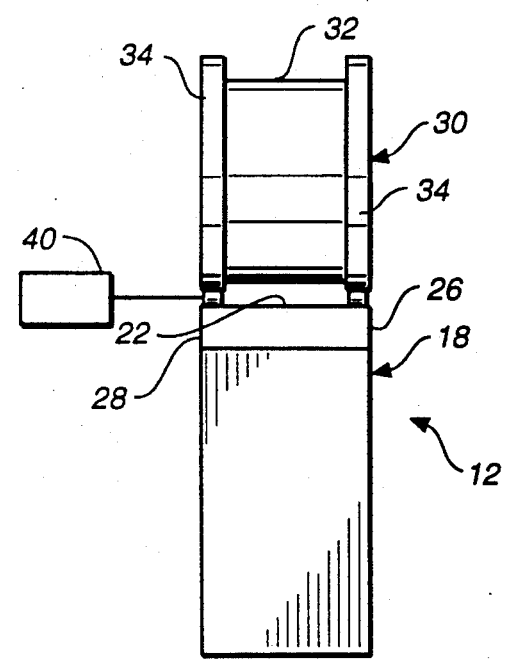
FIG._3

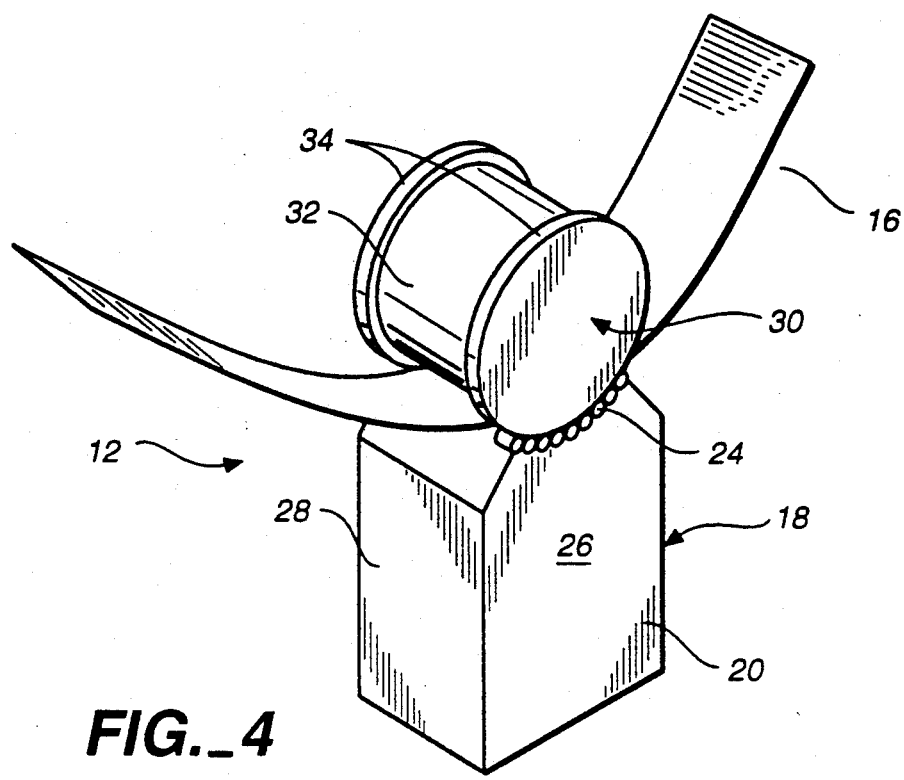
FIG._4
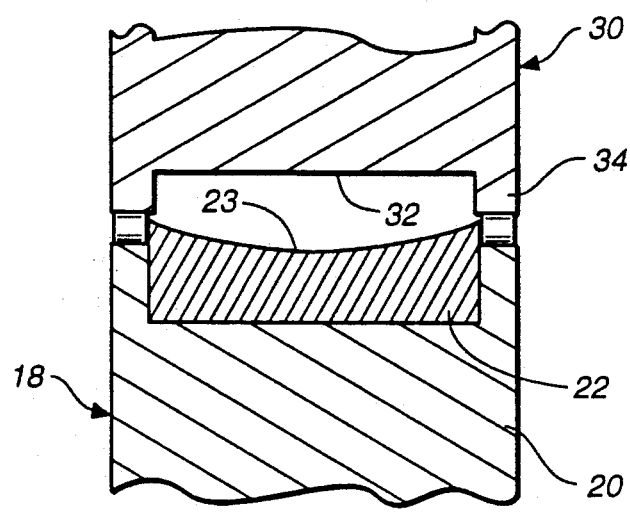
FIG._5

SYSTEM FOR THERMALLY ERASING DATA STORED ON AN OPTICAL RECORDING MEDIUM

FIELD OF THE INVENTION

The present invention generally relates to systems for thermally erasing data stored on a data storage medium and, more particularly, to systems for thermally erasing data stored on an optical recording medium such as a tape.

BACKGROUND OF THE INVENTION

Optical recording technology has been suggested as an alternative to magnetic storage techniques for storing data on a recording tape. More particularly, technology has been suggested for recording information by directing a scanning beam of laser light onto a moving data storage medium, such as a flexible optical tape, to produce unique domains on the tape that represent binary data bits. Such technology is described, for example in U.S. Pat. Nos. 4,719,615 and 4,912,696.

Also, techniques have been suggested for erasing data that has been stored on an optical data storage medium. For example, it has been proposed to remove data stored on an optical disk by placing the optical disk in an oven or similar heating device. In that way, the entire disk is heated and the data on the disk is erased. The disadvantage of such a system is that it results in the complete removal of all of the data on the disk. Thus, such a system is not well suited for erasing only selected data from an optical recording medium.

In another erasure method that has been suggested for erasing data from an optical recording medium, a laser beam is focused on the optical data storage medium to heat the surface of the medium and thereby cause erasure of the stored data. In other words, according to this method, data erasure is performed in very localized areas on an optical recording medium. Consequently, this method is not well suited for erasing large quantities of data over a relatively large section of an optical recording medium.

SUMMARY OF THE INVENTION

Generally speaking, the present invention provides an improved system for erasing data stored on an optical storage medium in relatively large increments.

In one preferred embodiment of the present invention, a system for erasing data stored on an optical storage medium in relatively large increments includes a housing, a guiding means mounted within the housing for guiding the optical recording medium on which the data is stored, and a heating means mounted within the housing in spaced opposition to the guiding means for generating heat to heat the optical recording medium and thereby thermally erase optical data stored on the medium. Preferably, the heating means includes a resistance heating element and the guiding means includes a guide roller having an outer peripheral surface for guiding the optical recording medium. The guide roller is provided with alignment rims that contact the mounting structure on which the resistance heating element is mounted to ensure that the surface of the guide roller and thus, the optical recording medium, remains spaced from the resistance heating element at a specified distance. Additionally, a means is provided for dissipating heat from the guide roller.

A method according to the present invention includes the steps of guiding an optical recording medium, such as an optical tape, along a guiding surface that is positioned in opposition to a resistance heating element and thermally heating the tape through operation of the resistance heating element to remove optical data from the tape. The heating step is preferably performed while the tape is spaced from the resistance heating element.

Preferably, the method also includes the step of dissipating heat from the guiding surface to avoid erasure of data on the tape when the operation of the resistance heating element is stopped. Also, the method preferably includes the step of guiding the edge portions of the tape closer to the resistance heating element than central portions of the tape to account for the greater heat loss that occurs at the edge portions of the tape as compared to the central portions of the tape.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic view of one type of unit including a thermal erasing apparatus according to the present invention;

FIG. 2 is a side view of a thermal erasing apparatus according to the present invention;

FIG. 3 is a front view of the thermal erasing apparatus of FIG. 2;

FIG. 4 is a top perspective view showing an optical recording medium, such as a tape, being guided through the thermal erasing apparatus of FIG. 2; and FIG. 5 is a cross-sectional view of the thermal erasing apparatus taken along the section line 5—5 in FIG. 2.

DESCRIPTION OF THE PREFERRED EMBODIMENT

FIG. 1, generally speaking, shows a system for erasing data stored on an optical recording medium that is employed on an optical video tape record and playback unit 10. Preferably, the optical recording medium is a flexible optical tape. A thermal erasing apparatus 12 and a read/write head 14 are mounted in the housing of the unit 10. Normally, the thermal erasing apparatus 12 is positioned sufficiently far upstream of the read/write head 14 with respect to the direction of movement (represented by arrow X) of the optical recording medium 16 positioning of the erasing apparatus 12 is positioned far enough upstream of the read/write head 14 to allow the tape 16 to cool before reaching the read/write head 14.

As seen in FIGS. 2 and 3, the erasing apparatus 12 includes an erase head 18 and an alignment guide roller 30. The erase head 18 includes a mounting structure 20 having a heating element 22 provided along an upper surface thereof so that the heating element faces the alignment roller 30. The mounting structure 20 is stationary. The alignment guide roller 30 is mounted in opposition to the erase head 18 and includes a tape receiving guide surface 32. Alignment rims 34 are positioned at the axial ends of the tape guiding surface 32. The outer diameter of the rims 34 is greater than the outer diameter of the tape guiding surface 32, with the result that the outer peripheral surface of the rims 34 is disposed farther radially outwardly than the guiding surface 32.

The heating element 22 is preferably a resistance heating element. In practice, the heating element is connected to a suitable power source (not shown). When the power source is activated, the resistance heating element warms up and radiates heat to heat the optical recording medium 16.

As shown in FIGS. 2 and 4, the opposite side surfaces 26, 28 of the mounting structure 20 are provided with bearings 24. The purpose and function of the bearings 24 will be apparent from the description below.

FIG. 4 also shows an optical recording tape 16 being guided by the guiding surface 32 so that the tape 16 moves along and in contact with the guiding surface 32. In practice, the distance between the alignment rims 34 is substantially equal to the width of the tape 16. In the preferred embodiment, the alignment rims 34 of the alignment roller 30 rest against the bearings 24 provided on the opposite side surfaces 26, 28 of the mounting structure 20. The contact between the alignment rims 34 and the bearings 24 on the mounting structure 20 is useful for ensuring that a predetermined and specified spacing is maintained between the heating element 22 and the tape 16. That is, the tape 16 is referenced to the alignment roller 30 by contact with the guiding surface 32, and the alignment roller 30 is referenced to the heating element 22 by contact between the rims 34 and the bearings 24. Accordingly, the tape 16 is always spaced from the heating element 22 at a constant distance. That constant distance can be readily determined, depending upon the amount of heat radiated by the heating element 22, the speed at which the tape 16 travels past the heating element 22, and the amount of heat necessary to effectively erase the data stored on the tape 16.

Because the data storage tape 16 is spaced from the heating surface 22 in the above-described system, the tape is preferably not heated by conduction (i.e. contact heating). Instead, the tape 16 is heated by thermal radiation. During radiant heating of the tape 16, it is desirable that all points on the tape 16 be heated to substantially the same temperature, thereby ensuring uniform erasure of any optical data stored on the tape. To assist in achieving uniform heating, the heating element 22 is configured such that the portions of the heating element 22 that oppose the outer edges of the tape 16 are located closer to the tape 16 than the portions of the heating element 22 that oppose the central area of the tape 16.

FIG. 5 shows the above-described configuration of the heating element 22. In this drawing, the heating element 22 has a concave surface 23 that results in the edge areas of the heating element 22 being closer to the tape guiding surface 32 than centrally located portions of the heating element 22. Accordingly, even though edge locations on the tape 16 normally dissipate heat more readily than central locations, the illustrated configuration ensures that each point across the tape width is subjected to substantially the same thermal heating—and, therefore, reaches substantially the same temperature.

As an alternative to configuring the heating element 22 in the manner shown in FIG. 5, substantially uniform temperatures across the width of the tape 16 are achieved by designing the heating element 22 to generate heat non-uniformly across the tape width. For example, the heating element could be designed to have nonuniform resistance across its width such that the resistance of the heating element varies as a function of the distance from the center of the heating element. As another example, the heating element 22 could be provided with printed heating elements positioned in a nonuniform spatial pattern. It should also be understood that these latter examples of providing nonuniform heating across the width of the heating element 22 could be employed in combination with the nonuniform spacing method described above and illustrated in FIG. 5.

When the tape 16 is thermally heated, some of the heat may be transferred to the alignment roller 30 either through the tape 16 or by way of the edges of the roller 30. In practice, there will be times when erasure of the data on the tape is desired and other times when erasure of the data on the tape is not desired. Because of that, it is useful that the apparatus be constructed such that the roller 30, and specifically the tape guiding surface 32, do not remain heated upon completion of an erasure operation—otherwise, unintended erasure of data on the tape 16 may occur. To reduce the chances of this happening, it is preferred that the bearings 24 on which the rims 34 of the alignment roller 30 rest are provided with a heat sink area or are connected to a heat sink (designated generally by number 40 in FIG. 3) for purposes of dissipating any heat that may be transferred to the alignment roller 30 during thermal heating of the tape 16.

During operation of the above-described system, the tape 16 is fed between the alignment roller 30 and the heating element 22 and will be guided around the tape guiding surface 32. When the heating element 22 is turned on, it radiates heat to thermally heat and, thereby, thermally erase data from the tape 16. After a desired portion of the data on the tape 16 has been erased, the heating element 22 is turned off. Because heat is dissipated from the alignment roller 30, the heating of the tape 16 and the erasure of data stored thereon will only occur in those areas desired.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An apparatus for thermally erasing data stored on an optical tape, comprising:
   a housing into which the tape is to be guided;
   an erase head positioned within the housing, the erase head including a resistance heating element provided on a mounting structure for heating the tape as the tape moves past the resistance heating element; and
   a guide roller around which the tape is guided, the guide roller being mounted within the housing in opposition to and spaced from the resistance heating element, the guide roller having an outer peripheral surface that defines a tape receiving surface for receiving and guiding the tape, the guide roller being provided with an alignment rim at each axial end thereof, the alignment rims contacting the mounting structure to ensure that the tape receiving surface is spaced from the resistance heating element so that the tape remains spaced from the resistance heating element as the tape moves along the tape receiving surface.

2. The apparatus according to claim 1, wherein the mounting structure is provided with bearings upon which rest the alignment rims.

3. The apparatus according to claim 1, including means for dissipating heat from the guide roller.

4. The apparatus according to claim 3, wherein the means for dissipating heat includes a heat sink connected to the bearings.

5. The apparatus according to claim 4, wherein opposing portions of the resistance heating surface and the tape receiving surface are positioned closer to one another at edge areas thereof than center areas thereof.

6. The apparatus according to claim 4, wherein the resistance heating element includes means for generating nonuniform heating across a width of the resistance heating element.

7. An apparatus for thermally erasing data stored on an optical recording medium, comprising:
a housing;
guiding means mounted within the housing for guiding the optical recording medium;
heating means including a resistance heating element mounted within the housing in spaced apart opposition to the guiding means for generating heat to thermally heat the optical recording medium and thereby thermally erase optical data stored on the optical recording medium.

8. The apparatus according to claim 7, including means for maintaining the guiding means at a spaced apart distance from the heating means to avoid contact between the optical recording medium and the heating means.

9. The apparatus according to claim 7, wherein opposing portions of the resistance heating surface and the tape receiving surface are positioned closer to one another at edge areas thereof than center areas thereof.

10. The apparatus according to claim 7, wherein the resistance heating element includes means for generating nonuniform heating across a width of the resistance heating element.

11. An apparatus for thermally erasing data stored on an optical recording medium, comprising:
a housing;
guiding means mounted within the housing for guiding the optical recording medium;
heating means mounted on a support structure within the housing in spaced apart opposition to the guiding means for generating heat to thermally heat the optical recording medium and thereby thermally erase optical data stored on the optical recording medium; and
alignment rim means positioned on opposite axial ends of the guiding means for contacting the support structure for maintaining a predetermined space between the guiding means and the heating means.

12. An apparatus for thermally erasing data stored on an optical recording medium, comprising:
a housing;
guiding means mounted within the housing for guiding the optical recording medium;
heating means mounted within the housing in spaced apart opposition to the guiding means for generating heat to thermally heat the optical recording medium and thereby thermally erase optical data stored on the optical recording medium;
means for maintaining the guiding means at a spaced apart distance from the heating means to avoid contact between the optical recording medium and the heating means; and
heat dissipating means for dissipating heat from the guiding means.

13. A method of erasing data recorded on an optical tape, comprising the steps of:
guiding a tape along a guiding surface that is positioned in opposition to and spaced from a resistance heating element;
heating the tape through operation of the resistance heating element to thereby remove optical data from the tape, the heating step being performed while the tape is spaced from the resistance heating element; and
dissipating heat from the guiding surface to avoid erasure of optical data on the tape when operation of the heating element is stopped.

14. The method according to claim 13, wherein the step of guiding the tape includes guiding the tape so that edge portions of the tape are positioned closer to the opposing areas of the resistance heating element than central portions of the tape.

15. The method according to claim 13, including the step of generating nonuniform heating across a width of the resistance heating element.

16. A method of thermally erasing data stored on an optical recording medium, comprising the steps of:
guiding a data storage medium along a guide surface of a guide roller that is positioned in spaced apart and opposing relation to a heating element so that the optical recording medium is spaced from the resistance heating element; and
operating the heating element while the optical recording medium is guided past the heating element to heat the optical recording medium to a temperature sufficient to thermally erase the data stored on the optical recording medium.

17. The method according to claim 16, including the step of dissipating heat from the guide roller to avoid erasing data stored on the optical recording medium when operation of the heating element is stopped.

18. The method according to claim 17, wherein the step of guiding the optical recording medium includes guiding the optical recording medium past the heating element so that edge portions of the optical recording medium are positioned closer to opposing areas of the heating element than central portions of the optical recording medium.

19. The method according to claim 17, including the step of generating nonuniform heating across a width of the resistance heating element.

* * * * *